Dec. 13, 1966  V. E. GIULIANO ETAL  3,292,148
CHARACTER RECOGNITION APPARATUS USING TWO-DIMENSIONAL
DENSITY FUNCTIONS
Filed May 8, 1961  8 Sheets-Sheet 1

Vincent E. Giuliano, Paul E. Jones Jr.
George E. Kimball, Richard F. Meyer, Barry A. Stein
INVENTORS BY
Attorney Vincent E. Giuliano
Paul E. Jones Jr.
George E. Kimball
Richard F. Meyer
Barry A. Stein
INVENTORS Dec. 13, 1966 V. E. GIULIANO ETAL 3,292,148
CHARACTER RECOGNITION APPARATUS USING TWO-DIMENSIONAL
DENSITY FUNCTIONS
Filed May 8, 1961 8 Sheets-Sheet 3

Vincent E. Giuliano
Paul E. Jones Jr.
George E. Kimball
Richard F. Meyer
Barry A. Stein
INVENTORS BY
Attorney Dec. 13, 1966    V. E. GIULIANO ETAL    3,292,148
CHARACTER RECOGNITION APPARATUS USING TWO-DIMENSIONAL
DENSITY FUNCTIONS
Filed May 8, 1961    8 Sheets-Sheet 4

Kx $K \cos^2 y$

Ky $K \cos^2 x \cos^2 y$

Kxy $K \sin^2(x-y)$ $K \cos^2 x$

Vincent E. Giuliano
Paul E. Jones Jr.
George E. Kimball
Richard F. Meyer
Barry A. Stein
        INVENTORS BY
        Attorney Dec. 13, 1966 V. E. GIULIANO ETAL 3,292,148
CHARACTER RECOGNITION APPARATUS USING TWO-DIMENSIONAL
DENSITY FUNCTIONS
Filed May 8, 1961 8 Sheets-Sheet 5

Vincent E. Giuliano
Paul E. Jones Jr.
George E. Kimball
Richard F. Meyer
Barry A. Stein
INVENTORS BY *[signature]*
Attorney Dec. 13, 1966   V. E. GIULIANO ETAL   3,292,148
CHARACTER RECOGNITION APPARATUS USING TWO-DIMENSIONAL
DENSITY FUNCTIONS
Filed May 8, 1961   8 Sheets-Sheet 6

Vincent E. Giuliano
Paul E. Jones Jr.
George E. Kimball
Richard F. Meyer
Barry A. Stein
INVENTORS BY  *Burnie A. Lupper*
Attorney Dec. 13, 1966 V. E. GIULIANO ET AL 3,292,148
CHARACTER RECOGNITION APPARATUS USING TWO-DIMENSIONAL
DENSITY FUNCTIONS
Filed May 8, 1961 8 Sheets-Sheet 7

Vincent E. Giuliano
Paul E. Jones Jr.
George E. Kimball
Richard F. Meyer
Barry A. Stein
INVENTORS BY *Bessie A. Lippen*
Attorney Vincent E. Giuliano, Paul E. Jones Jr., George E. Kimball
Richard F. Meyer, Barry A. Stein
*INVENTORS*

3,292,148
CHARACTER RECOGNITION APPARATUS USING TWO-DIMENSIONAL DENSITY FUNCTIONS

Vincent E. Giuliano, Concord, Paul E. Jones, Jr., Cambridge, George E. Kimball, Winchester, Richard F. Meyer, Sudbury, and Barry A. Stein, Brookline, Mass., assignors to Arthur D. Little Inc., Cambridge, Mass., a corporation of Massachusetts
Filed May 8, 1961, Ser. No. 108,571
15 Claims. (Cl. 340—146.3)

This invention relates to method and apparatus for sensing and identifying information-bearing indicia or indicia manifestations. More particularly it relates to a novel method of character recognition which is applicable to a wide variety of indicia including, in addition to letters and numerals, symbols, figures, maps, charts, photographs, sound spectrographs, and other two-dimensional patterns.

In the rapidly growing field of automatic information handling, method and apparatus for sensing and identifying information-bearing indicia are essential. Machines designed for sensing, reading and identifying indicia make possible the direct machine conversion of indicia for use in recording, computing, storing, communicating, processing, translating and the like. The ever-increasing amount of paper work being thrust upon business makes such so-called character recognition methods not only very desirable but also necessary if the large volume of work is to be handled expeditiously and economically. As examples where character recognition devices can be readily applied we may cite the processing of checks, credit accounts, sales reports and, when a variety of fonts can be read, the processing of natural language information.

Prior art

A large number of methods and types of apparatus have been recently developed for automatic character recognition. Essentially all of the optical character recognition systems which are now in operation have been based upon one or more of three techniques.

The simplest of these techniques is that of optical pattern superposition and matching. In a machine based on this technique a set of photographic or optical masks is used, with each mask representing a given character or the negative of a character. An unknown character is optically projected onto all the masks in the collection, either simultaneously or sequentially, and one or more photocells behind each mask determines the degree of match between the unknown image and the known positive or negative given by the mask. The image from a given character must be divided into as many beams as there are possible characters, or a sequential mechanical arrangement must be used, such as that commonly provided by a rotating disk. Such machines can be seen to suffer from major difficulties in mechanical registration and speed, difficulties that have never been adequately resolved.

In a reading machine based on the second technique, a character is scanned in a spot-by-spot manner, either by a mechanical scanner, a cathode ray optical scanner, or by passing the image of a character past a vertical bank of photocells. The resulting information is transmitted into a set of logical circuits, or into a logical matrix representing the area of a character. In either case the information is processed by a number of logical algorithms to determine if certain component features are present in the character, for example, to determine if it contains given curved elements, etc. By using a sufficient amount of logical circuitry the machine can identify specific characters. The circuits in any one machine of this type are valid only for specific characters; in practice, only a few characters can be recognized, for otherwise the circuits become too complex. To adjust for a change in font requires changing most of the logic of the system, thus making this type of device relatively inflexible. These machines suffer also from a need for very precise mechanical registration, and the circuitry needed to enable adjustment for position and mass must be complicated and extensive.

A machine based on the third technique uses a vertical bank of photocells, and reads the image of a character into an electronic logical matrix of flip-flop elements. Each segment of a character area may be black or white and likewise each element in the logical matrix will either be in an on or off state. Adjustment with respect to position can be obtained in a machine of this type by providing the matrix with a shifting capability to enable shifting of the entire image in a vertical or horizontal manner to a standard position. Recognition is based on comparison of known off-on patterns with that for the unknown character. This type of machine suffers firstly in that a very large number of photocells must be used; typically, the vertical array might require 30 or more photocells. This entails major optical and mechanical problems. Secondly, a logical shifting matrix of the size needed, requiring 800 or more elements, is very expensive. As in the case of the second type, adjustment for a different font requires extensive changes in the logic.

The majority of the devices designed according to one or a combination of the methods outlined are primarily designed to handle one particular font of characters, and, although they can in some cases be adjusted to convert from one font to another, this is not readily achieved. Moreover, some of them require special fonts of characters or such precision in registration as to be limited to very special applications.

Objects

We have found by the application of fundamental and practical mathematical principles heretofore not applied to the problem of character recognition that we can provide a method of sensing and identifyiing information-bearing indicia which offers advantages over the prior art methods. These advantages include greater simplicity, low cost, increased flexibility in dealing with different fonts of type and less need for precision in mechanical registration of the indicia to be recognized.

It is therefore a primary object of this invention to provide a method of character recognition which can yield adequate discrimination for characters in conventional fonts, using simpler and less critical optics, magnetics or electronics than is currently required. It is another object of this invention to provide a method of indicia identification which achieves character discrimination and recognition and which is at the same time insensitive to variations in the relative positioning and orientation of the character and the device, and to the density of the print, to variations in size, and to the boldness of the character itself. It is yet another object of this invention to provide a method of character recognition which is not font-dependent, which is capable of "universal" or total normalization, and which is resistant to "noise," whether introduced as part of the indicia itself or inherent in the steps of the method.

It is another object of this invention to provide apparatus for character recognition which is characterized by its simplicity, and its flexibility in dealing with variable fonts of type. These and other objects will become apparent in the following description of this invention.

Figures

The method and apparatus of this invention may be further described with reference to the accompanying drawings in which FIG. 1 is a schematic diagram of the apparatus of this invention showing the particular components of the system;

Definitions

Figure 1:
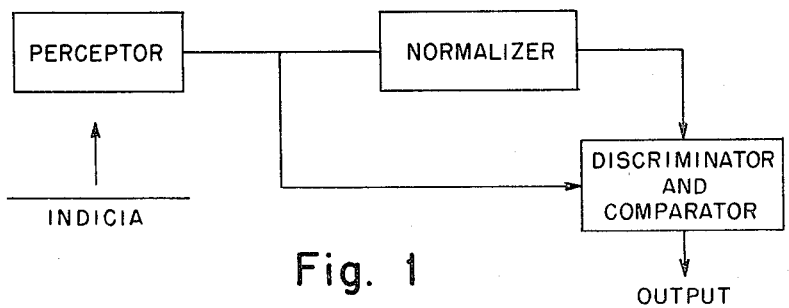

Throughout the discussion which follows and in the claims, mathematical terminology is employed to describe the invention. In keeping with this form of presentation, the apparatus components and the process are characterized in terms of mathematical operations whereas the indicia to be recognized and the attenuating means employed in the process are characterized in terms of mathematical functions.

Let $\rho(x,y)$ be any function over a region $R$ such that for every point $(x_o, y_o)$ in $R$ $0 \leq |\rho(x_o, y_o)| \leq 1$. Any such function $\rho(x,y)$ can be considered as a representative of a point-by-point distribution of a finite measurable phenomenon over $R$ when appropriately scaled units of measurement are used. If, for example, the measurable phenomenon is a quantity of energy, $\rho(x,y)$ may be described as an "intensity function," with the value of the function at a given point being a number proportional to the quantity of energy measurable at that point. Alternatively, if the measurable phenomenon is a quantity of transmission attenuation, $\rho(x,y)$ may be described as a "density function," with the value of the function at a given point being a number proportional to the transmission at that point. The function $\rho(x,y)$ can, of course, be considered as a representative of a point-by-point distribution of a finite phenomenon over $R$ even when the phenomenon is not accessible to direct measurement.

Any distribution of energy in two dimensions will be called an "image." The term "indicia," also used, includes "image" as a special case and denotes any two-dimensional representation of a thing. Examples of images include two-dimensional distributions of light intensity or other forms of radiant energy as well as two-dimensional distributions of electronic or mechanical energy; examples of indicia include images as well as characters, maps, graphs, photographs, figures, cathode ray tube displays, and the like.

Any means of attenuating a two-dimensional energy distribution will be called a "mask." Energy attenuating means may be designed to selectively attenuate any suitable form of energy including radiant energy (light), mechanical energy, or electronic energy. Therefore, they may be optical masks, lenses, optical wedges, contoured slits, magnetic fields of varying intensities, and the like. The different energy attenuating means will be described further below; but for convenience of presentation of the theory underlying the method of this invention it will be assumed as an example that the energy is in the form of a beam of parallel light and that the energy attenuating means take the form of devices which are capable of transmitting, transforming, or absorbing quantities of light. More particularly, these energy attenuating means will conveniently be one or more optical masks each of which is weighted according to a selected continuous mathematical function. As will be shown later, optical wedges or contoured slits may also be employed as masks in an optical system.

Figure 3:
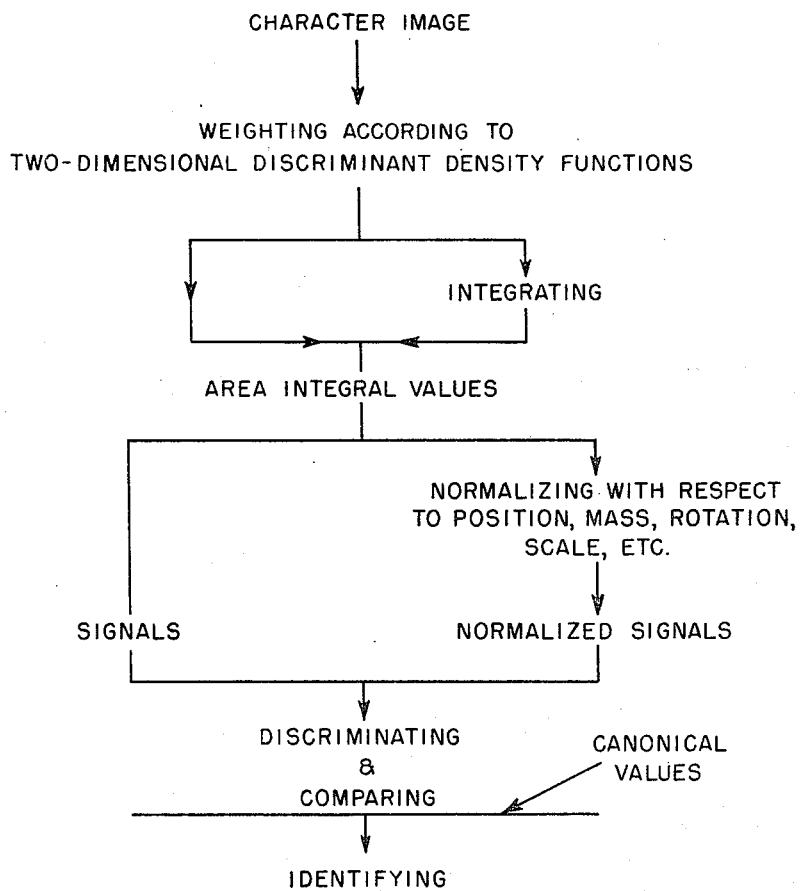
FIG. 3 is a flow diagram of the steps of one embodiment of the method of this invention.

Basically, the apparatus of this invention comprises a perceptor, a normalizer, and a discriminator/comparator. FIG. 1 illustrates these basic apparatus components. The function of the perceptor is to obtain certain measurements dependent on the indicia. The function of the normalizer is to transform the output of the perceptor to eliminate the effect of those variations of the indicia which are selected as non-significant. Finally, the discriminator/comparator has as its function the identification of the indicia. As will be seen in FIG. 3, the output of the perceptor may be transmitted directly to the discriminator/comparator or may be transmitted in whole or in part via the normalizer.

Figure 2:
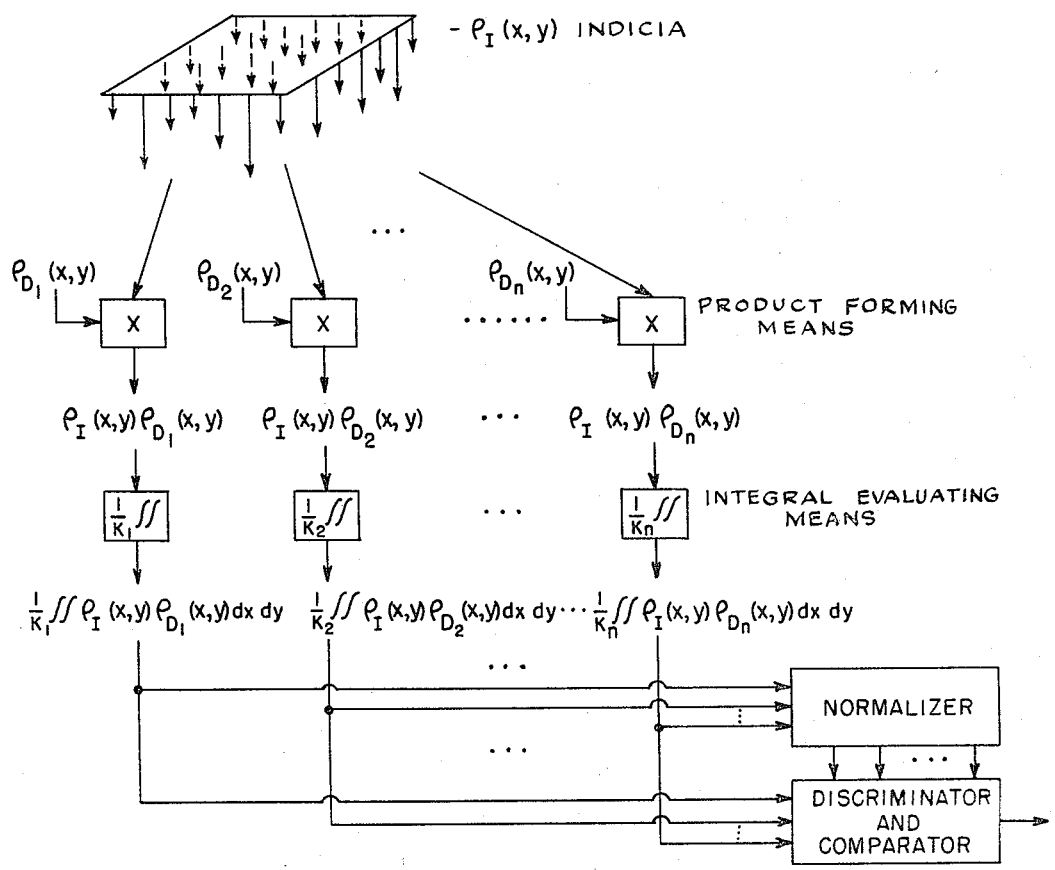
FIG. 2 is a diagrammatic representation of the method of this invention.

FIG. 2 is a diagrammatic representation of the process of this invention presented for an understanding of the basic concepts and theories involved. The indicia is represented by $\rho_I(x,y)$ and serves as input to the perceptor which comprises means of forming the product of $\rho_I(x,y)$ and members of a set of two-dimensional density functions $\rho_{D_i}(x, y)$ and means of evaluating integrals $$\iint \rho_I(x, y) \rho_{D_i}(x, y) \, dx \, dy$$

called "measurements." These measurements are capable of being normalized in a novel way as will be described below.

Theoretical considerations

Figure 4:
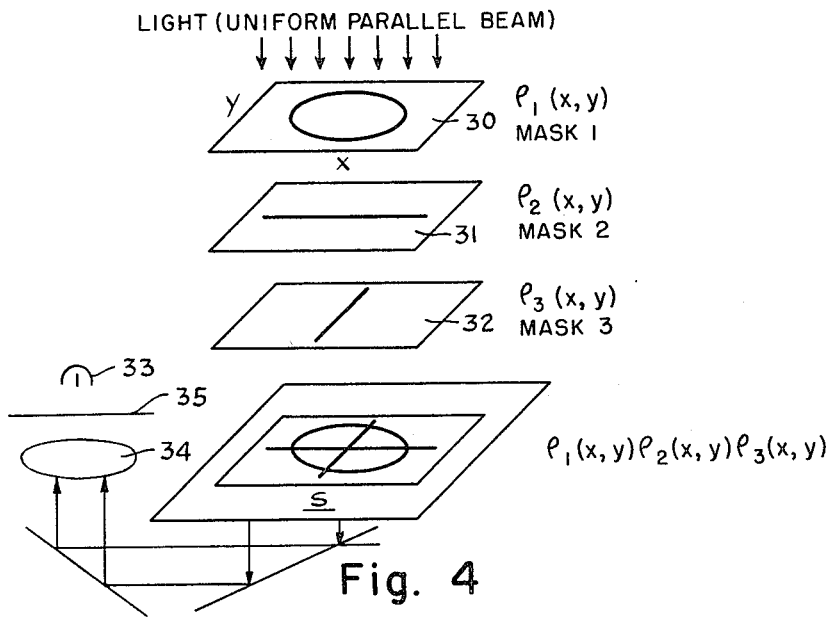
FIG. 4 is a schematic representation of the use of weighting masks to obtain a product of density functions when light is used.

Before describing the method and apparatus further it will be convenient to review a portion of the theory. For purposes of illustration it will be assumed that certain algebraic operations of measurement are performed by optical means, and more particularly by the use of optical masks. The particular optical configuration exhibited is meant to be illustrative and not limiting. To begin, we may conceive of a series of variably transparent exposed photographic plates 30, 31 and 32 stacked one on top of another as shown in FIG. 4. We suppose that $x$ and $y$ coordinates are defined along the edges of each plate as shown. Optically, each plate is characterized by its transmissivity to light as a point function of $x$ and $y$. For present purposes of illustration it is represented by letting $\rho_i(x,y)$ be a density function representing the transparency of plate $i$ at point $(x,y)$. The scaling will be such that $\rho_i(x, y) = 1$ where the plate $i$ is completely transparent, and always $0 \leq |\rho_i(x, y)| \leq 1$.

If incoherent light is used, the density function $\rho_i(x,y)$ may be chosen to modulate the intensity of the resulting beam. If coherent or polarized light is used, the density function may be used to modulate both the phase and amplitude of the resulting beam according to the density functions used; in the latter case the density function represents a complex quantity. However, for the purpose of the ensuing discussion, it will be presumed to have real numerical values corresponding to the use of incoherent light.

Referring again to FIG. 4, a parallel beam of light, supplied from any suitable well-known source such as a light positioned at the focal point of a convex lens, of unit intensity, uniform in intensity over $x$ and $y$ and incoherent, is presumed to be normally incident on the topmost plate. Depending on the transparency functions of the individual plates, at each point $(x,y)$, some, all, or none of the incident light penetrates all of the plates and falls on the surface S. In the presentation of this example it is presumed that either a monochromatic light source with the transparency functions defined for the light frequency is employed or, more generally, filters are used which have uniform frequency response over whatever spectrum is employed. The intensity of light after passing only through the topmost plate 30 at $(x,y)$ is by definition $\rho_1(x,y)$. The intensity after falling through the top two plates 30 and 31 is then $\rho_1(x,y)\rho_2(x,y)$, and the intensity of light at point $(x,y)$ on the surface S is therefore the product:

$$\rho_1(x,y)\rho_2(x,y) \ldots \rho_n(x,y) \tag{1}$$

This leads to what may be called the principle of optical multiplication: optical projection through semi-transparent masks is equivalent to point-by-point multiplication of the transparency functions of the individual masks.

Now assume that the total light passing through the plates 30, 31 and 32 in FIG. 4 and incident on S is measured, say by means of a single photocell 33 with an appropriate lens 34 and diffuser 35 arrangement. This measurement defines the integral:

$$\iint \rho_1(x, y)\rho_2(x, y) \ldots \rho_n(x, y)dxdy \tag{2}$$

This leads to what may be called the principle of optical integration: the total amount of light transmitted through a series of semi-transparent masks defines the area integral of the product of the transparency functions of the individual masks.

Figure 5:
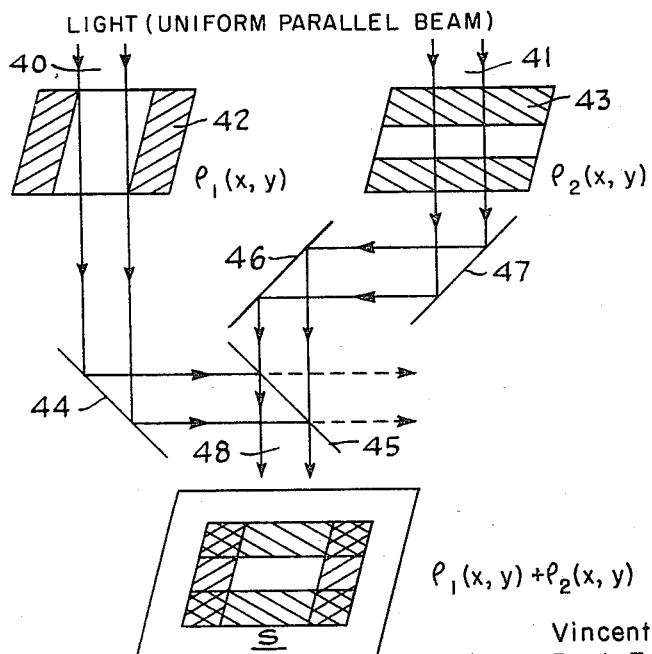
FIG. 5 is a schematic representation of the use of weighting masks to obtain a sum of density functions when light is used.

Optical addition is based on the superposition of images instead of the superposition of masks. One manner of accomplishing this is illustrated in FIG. 5. Uniform light, from such as any light source behind a diffusion screen of unit intensity is here presumed to be separated into two identical beams 40 and 41 which are separately projected on masks 42 and 43 with transparency functions $\rho_1(x, y)$ and $\rho_2(x, y)$. Then by means of suitable optics, such as mirrors 44–47, the beams emergent from the two masks are superposed as shown as beam 48. The resulting intensity on S is then:

$$\tfrac{1}{2}(\rho_1(x, y) + \rho_2(x, y)) = \rho_S$$

This can be stated as a principle of optical addition: optical superposition of images of light passing through semi-transparent masks is equivalent to point-by-point addition of the transparency functions of the individual masks. (This principle is valid for intensities when the light is incoherent, for amplitudes when the light is coherent.)

It can be seen that $0 \leq |\rho_S| \leq 1$, so that the sum of two transparency functions represents a transparency function realizable by a single mask.

The optical operations are subject to the condition that the resulting intensity functions must be everywhere non-negative. Optical determination of differences must therefore be based on the use of a complementation technique. Thus we may define the complement of a mask with density function $\rho(x, y)$ to be a mask with density function $1-\rho(x, y) = \bar{\rho}(x, y)$.

The difference between $\rho_1(x, y)$ and $\rho_2(x, y)$ plus the constant 1 can be formed by adding $\rho_1(x, y)$ and $\bar{\rho}_2(x, y)$, giving by the addition principle $$\rho_1(x, y) - \rho_2(x, y) + 1 = \rho_1(x, y) + \bar{\rho}_2(x, y) \tag{4}$$

Both addition and multiplication are of course associative and commutative, and the distributive law holds:

$$\rho_1(\rho_2 + \rho_3) = \rho_1\rho_2 + \rho_1\rho_3 \tag{5}$$

Closure exists under multiplication; that is, the product function obtained by superposing any number of masks may itself be realized by a single mask.

With respect to multiplication both a zero (0) and a unity (I) element exist; these are respectively the completely opaque mask and the completely transparent mask. For any $\rho_i$, then:

$$0 \cdot \rho_i = \rho_i \cdot 0 = 0$$
$$I \cdot \rho_i = \rho_i \cdot I = \rho_i \tag{6}$$

The only element having an inverse under multiplication, however, is I itself, and the algebra therefore falls short of being a group with respect to multiplication.

With respect to multiplication, then, closure, associativity, commutativity, zero and unity elements have been defined, but inverses are not defined.

With respect to addition, closure does not hold unless the light intensity is adjusted so that the sum of the intensities incident on all of the masks is unity. If this assumption is made, every element has an inverse with respect to ½, that is $\rho + \bar{\rho} = \tfrac{1}{2}$, but no "zero" element exists for addition, i.e., there is no element $\theta$ such that $\theta + \rho_j = \rho_j$ for every $\rho_j$.

Stated positively, the optical operations enable the realization of any function which is a sum of products of two-dimensional density functions $0 \leq |\rho_i| \leq 1$. Moreover, applying the integration principle, optical measurement of any integrals of the following form becomes possible:

$$I = \iint [(\rho_{11}\rho_{12} \ldots \rho_{1n_1}) + (\rho_{21}\rho_{22} \ldots \rho_{2n_2})$$
$$+ \ldots + \rho_{m1}\rho_{m2} \ldots \rho_{mn_m})]dxdy \tag{7}$$

The foregoing considerations have shown the flexibility with which algebraic functions can be manipulated by optical means. As a consequence, simple and practicably realizable functions can be combined to enable the realization of fairly complicated functions as desired.

Method of invention

Returning now to FIGS. 2 and 3 it may be stated that the process of this invention is characterized by the step of obtaining measurements of the form $$\iint \rho_I(x, y)\rho_{D_i}(x, y)dxdy$$

wherein each $\rho_{D_i}(x, y)$ is a reasonable facsimile of a continuously varying density function which is independent of $\rho_I(x, y)$, and at least one of which is non-constant in at least one dimension and $\rho_I(x, y)$ is any function, thereby to obtain a set of measurements representative of $\rho_I(x, y)$. These measurements may chosen so that they are in themselves "complete" in that they are amenable to normalization.

More particularly, the method of this invention may be defined as comprising the steps of directing an image $\rho_I(x, y)$ of an indicia through a set of selective energy attenuating systems which weight the image according to a set of two-dimensional discriminant density functions $\rho_{D_i}(x, y)$ thereby to obtain a set of product images $$\rho_I(x, y)\rho_{D_i}(x, y)$$

of the density functions; detecting a proportional fraction of each of the total energies transmitted through the system, each of the total energies being represented as an integral $\iint \rho_I(x, y)\rho_{D_i}(x, y)dxdy$ thereby to obtain a set of measurable signals representative of the integrals; normalizing the set of measurable signals to canonical representations and classifying the normalized representations with respect to a set of predetermined normalized representations known to represent a given set of canonical indicia. The term "canonical" is hereinafter used adjectively in the sense that it is normally employed in mathematical discussions with the meaning "of standard form especially if the form is simple." (See for example "The International Dictionary of Applied Mathematics," D. van Nostrand Co., Inc., Princeton, N.J., 1960, page 108.)

Continuing to take an optical system as an example of one embodiment of this invention, the steps outlined above may now be further defined and related to apparatus components.

Perception

In a typical optically-oriented apparatus the perceptor (FIG. 1) includes a small number of optical masks weighted not as the characters themselves, but rather according to certain continuous mathematical functions. The masks $\rho_{D_i}(x, y)$ may be thought of as variable photographic transparencies or similar light transmitting bodies. An image $\rho_I(x, y)$ manifested as a distribution of light intensity is simultaneously directed on all of the masks, and a photometric device such as a single photocell behind each mask enables direct measurement of the integrals.

$$C_i = \iint \rho_{D_i}(x, y) \rho_I(x, y) dx dy \qquad (8)$$

The process may be based entirely on geometric optics; this means that it is not necessarily dependent upon diffraction or other wave-optical phenomena, although these may be used.

By judicious selection of the mask weighting functions, the measured integrals can be made to yield coefficients in a series expansion of the intensity function $\rho_I(x, y)$ of the unknown indicia. For example, if the masks are weighted as follows:

$$\begin{array}{ll} \rho_{D_1}=1 & \rho_{D_6}=y^2 \\ \rho_{D_2}=x & \rho_{D_7}=x^3 \\ \rho_{D_3}=y & \rho_{D_8}=x^2y \\ \rho_{D_4}=x^2 & \rho_{D_9}=xy^2 \\ \rho_{D_5}=xy & \rho_{D_{10}}=y^3 \end{array} \qquad (9)$$

then the measurements $$M_i = \iint \rho_{D_i}(x, y) \rho_I(x, y) dx dy \qquad (10)$$

represent the moments of the indicia, the Taylor's series coefficients of the Fourier transform of the indicia. The first few terms of this series are:

$$\begin{aligned} M_1 &= \iint \rho_I(x, y) dx dy \\ M_2 &= \iint x \rho_I(x, y) dx dy \\ M_3 &= \iint y \rho_I(x, y) dx dy \\ M_4 &= \iint x^2 \rho_I(x, y) dx dy \end{aligned} \qquad (10)$$

etc.

As is well known, any physically realizable two-dimensional function can be approximated as closely as desired by taking a sufficient number of terms in such a series expansion, provided $\rho_{D_i}(x, y)$ are selected from a set of functions which is complete over the area of integration.

Figure 6:
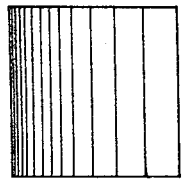
FIGS. 6–8 show typical masks suitable for polynomial weighting functions.
Figure 10:
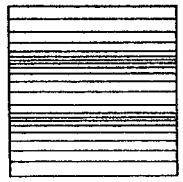
FIGS. 9–12 show typical masks suitable for trigonometric weighting functions.
Figure 7:
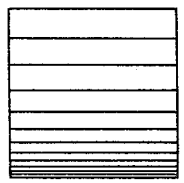
Figure 11:
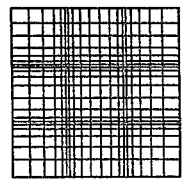
Figure 8:
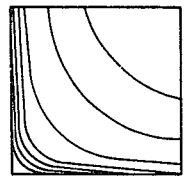
Figure 12:
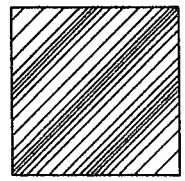
Figure 9:
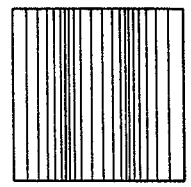

Typical selectively attenuating systems suitable for use to obtain such simple polynomial weighting functions are illustrated in FIGS. 6–8. These are masks which are respectively weighted as $x$, $y$ and $xy$ and are therefore constructed in a manner to continuously vary the density of each of the masks so that it is nonconstant in at least one dimension. Thus it is nonconstant with respect to $x$ in FIG. 6 and with respect to $y$ in FIG. 7. The mask in FIG. 8 will be seen to be a combination of those of FIGS. 6 and 7 and is constructed so that it is nonconstant in both dimensions. It will be appreciated that in drawing these masks in FIGS. 6–8 (as well as those in FIGS. 9–12) it was necessary to indicate density by the distance separating lines. However, it is to be understood that the masks as constructed are continuously varying in the direction indicated, the variations in FIGS. 6–8 for example being linear in one dimension or both.

Thus in accordance with the preliminary discussion of algebraic operations by optical means, the integrals $M_1$, $M_2$ ... etc. 10 can readily be measured by (1) Superposing masks with the density functions $\rho_{D_i}(x,y)=x^r y^s$ ($r,s=1, 2, 3 \ldots$) upon the unknown image $\rho_I(x,y)$ to form the product $\rho_{D_i}(x,y)\rho_I(x,y)$, and (2) Measuring a fractional part of the total light of the image transmitted through each mask, obtaining a set of measurements related by constant factors to:

$$M_i = \iint \rho_{D_i}(x,y) \rho_I(x,y) dx \, dy$$

As was previously observed, these measurements represent the moments of the indicia. Therefore simple formulas can be used which perform such operations as transformation to center of gravity, rotation to principal axes, and conversion to dimensionless and mass-free quantities. Thus measurements can be obtained that are the same for specifically selected variations of the aspect of the indicia. When the indicia of interest are derived from printed characters, for example, such variations may include modifications in the relative positioning and orientation of the character and the mask as well as modifications in the size, density of print and degree of boldness of the character itself. In affording compensation for such variations, the process of this invention greatly simplifies the ultimate identification and recognition of the characters.

Given that the voltages resulting from the normalization process are sufficiently distinct, identification of characters can be based on simple, well-known multivariable voltage-measurement techniques. It is important to note that all portions of the system other than the voltage discriminator are font-independent. Even if the voltage discriminator is font-dependent, a reader based on the principles outlined can readily be converted from reading one font to another by simple adjustments of the reference voltages.

The foregoing example illustrated the use of masks $\rho_{D_i}(x,y)$ which were simple polynomials.

More complicated polynomial functions, which can be prepared in the manner previously described, might offer advantages for the control of errors and noise. For example, the Legendre polynomials orthogonalized over the unit square may be utilized. These are:

$$\begin{array}{ll} P_{00}=1 & P_{02}=6y^2-6y+1 \\ P_{10}=2x-1 & P_{30}=20x^3-30x^2+12x-1 \\ P_{01}=2y-1 & P_{21}=(6x^2-6x+1)(2y-1) \\ P_{20}=6x^2-6x+1 & P_{12}=(2x-1)(6y^2-6y+1) \\ P_{11}=(2x-1)(2y-) & P_{03}=20y^3-30y^2+12y-1 \end{array} \qquad (11)$$

Since the density functions must be within the range $0 \leq |\rho_i| \leq 1$, the masks must be made with adjusted scale and initial value coefficients. For example, masks can be made for:

$$\begin{array}{ll} P_{00}'=P_{00} & P_{02}'=\tfrac{1}{3}+\tfrac{2}{3}P_{02} \\ P_{10}'=\tfrac{1}{2}+\tfrac{1}{2}P_{10} & P_{30}'=\tfrac{1}{2}+\tfrac{1}{2}P_{30} \\ P_{01}'=\tfrac{1}{2}+\tfrac{1}{2}P_{01} & P_{21}'=\tfrac{1}{2}+\tfrac{1}{2}P_{21} \\ P_{20}'=\tfrac{1}{3}+\tfrac{2}{3}P_{20} & P_{12}'=\tfrac{1}{2}+\tfrac{1}{2}P_{12} \\ P_{11}'=\tfrac{1}{2}+\tfrac{1}{2}P_{11} & P_{03}'=\tfrac{1}{2}+\tfrac{1}{2}P_{03} \end{array} \qquad (12)$$

Alternatively, masks $\rho_{D_i}(x,y)$ which are trigonometric functions may be used. Conveniently such masks are generated by the use of polarized light. Four different types of these trigonometric weighing function masks are illustrated in FIGS. 9–12. These represent $K \cos^2 x$, $K \cos^2 y$, $K \cos^2 x \cos^2 y$ and $K \sin^2(x-y)$, respectively. It will be noted that these are nonconstant in at least one dimension as required.

If masks are weighted to represent trigonometric functions, it is possible by optical integration to measure coefficients in the Fourier series expansion of the intensity function $\rho_I(x,y)$ represented by the indicia. The trigonometric functions $$\begin{array}{ll} \cos 2m\pi x \cos 2n\pi y & (m=0,1,\ldots; \; n=0,1,\ldots) \\ \sin 2m\pi x \cos 2n\pi y & (m=1,2,\ldots; \; n=0,1,\ldots) \\ \cos 2m\pi x \sin 2n\pi y & (m=0,1,\ldots; \; n=1,2,\ldots) \\ \sin 2m\pi x \sin 2n\pi y & (m=1,2,\ldots; \; n=1,2,\ldots) \end{array} \qquad (13)$$

are orthonormal in the unit square, and masks can be weighted according to a subset of them. For example, a set of ten masks based on cosine expansions might be given by weighting the masks as $P_{ij}=\tfrac{1}{2}+\tfrac{1}{2}T_{ij}$ where:

$$\begin{array}{ll} T_{00}=1 & T_{02}=\cos 4\pi y \\ T_{10}=\cos 2\pi x & T_{30}=\cos 6\pi x \\ T_{01}=\cos 2\pi y & T_{21}=(\cos 4\pi x)(\cos 2\pi y) \\ T_{20}=\cos 4\pi x & T_{12}=(\cos 2\pi x)(\cos 4\pi y) \\ T_{11}=(\cos 2\pi x)(\cos 2\pi y) & T_{03}=\cos 6\pi y \end{array} \qquad (14)$$

Figure 13:
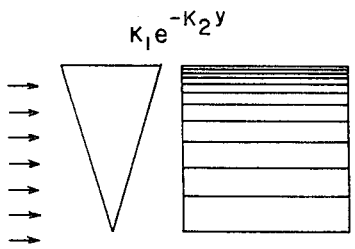
FIG. 13 shows a typical optical wedge and its output suitable for the generation of an exponential weighting function using light.

As another illustration, masks $\rho_{D_i}(x,y)$ which are exponential functions may be used. Conveniently such masks are generated by wedge-shaped filters made of material with uniform optical density. FIG. 13 schematically illustrates such a filter and the typical weighting function which it produces.

Finally, combinations of polynomial, trigonometric and exponential functions may be used as masks $\rho_{D_i}(x,y)$ and can be prepared, as previously discussed, by means of the techniques for optically manipulating functions. As an alternative to the use of several masks, one or more of them may be rotated or moved relative to the indicia.

In all these cases, an appropriate set of masks can be selected to permit normalization relative to the variations in indicial aspect.

Figure 14:
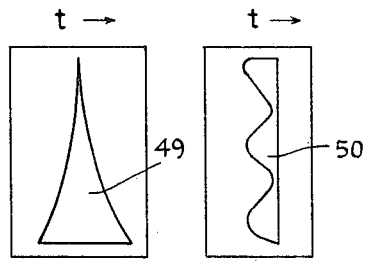
FIG. 14 illustrates two typical contoured slits.
Figure 15:
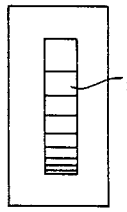
FIG. 15 shows a typical weighted slit.

Likewise, in a manner which is completely equivalent to that described for the utilization of masks of the forms illustrated in FIGS. 6–13, contoured slits 49 and 50 such as those illustrated in FIG. 14 or weighted slits 51 such as that illustrated in FIG. 15, may be used. In these latter cases, the slits will be moved with relation to the character image (or the character image may, of course, be moved with relation to the slit). Then the $x$ dimension is replaced by the time dimension, $t$, and the density of the weighting function becomes $\rho_{D_i}(t,y)$. However, depending upon the speed of such motion it will be understood that $x$ and $t$ are related by a functional relationship; and the use of $\rho_D(x,y)$ is meant to include $\rho_D(t,y)$.

Selective attenuation in the $x$ direction in case of the use of such slits may be accomplished by any one or combination of three means: the first of such means involves variations in intensity of the energy source with the movement of the slits; the second means involves variation in the relative velocity of the slits and the indicia; and the third means involves time integration of the signals produced by slits moving at constant relative velocity. If the third means, involving multiplication of the output of each slit by a function of time and then performing integration is used, the multiplication and integration may be accomplished by standard digital or analog equipment.

In the case of the use of slits, selective attenuation is meant to include all means described in the previous paragraph. Any manipulations required with the use of slits in order to produce independent selective attenuation in two dimensions are considered to be a part of the first step of the process of this invention.

It will be appreciated that when forms of energy other than light are used, then the selectively attenuating means will be appropriately chosen. Thus for example, varying electric or magnetic fields, supplied by a uniformly-charged plate for example, can be used with polarized filters to mask indicia represented as intensity functions of polarized light. Likewise, variable absorption cross-sections can be used to attenuate indicia represented as intensity functions of electron beams. Other forms of energy with appropriate attenuating systems may, of course, also be used.

Obviously, many different but equivalent optical and/or mechanical arrangements for superposing masks and images are possible and any mechanical apparatus which achieves this superpositioning is suitable. In particular, the formation of the product of an image $\rho_I(x,y)$ and the discriminant density functions $\rho_{D_i}(x,y)$ may be accomplished in either order, viz., $\rho_I(x,y) \cdot \rho_{D_i}(x,y)$ or $\rho_{D_i}(x,y) \cdot \rho_I(x,y)$. Furthermore, it is not required for purposes of forming such product that the image pass through a filter. It is within the scope of this invention to achieve attenuation by alternative means such as the selective scattering or reflecting of energy while collecting a portion thereof.

*Detection*

At this point in the process of character recognition there is obtained a set of measurable values which may be defined as being in themselves "complete" and amenable to such normalization as desired. It will be understood that a set may comprise one or more of such values. It then becomes necessary to determine a proportional fraction of the total energy represented by each of the integrals $\iint \rho_I(x,y) \rho_{D_i}(x,y) dx\, dy$.

The energy measured may be the total energy or a fraction thereof, and it will be understood that the use of the term "proportional fraction" includes the whole or total energy, (i.e., the fraction 1/1) as well as amounts less than the total.

The actual detecting may be accomplished by any method known in the art of energy detection and the particular method will, of course, be chosen as one adaptable to the form of energy used to represent the integrand of the integral $\iint \rho_I(x,y) \rho_{D_i}(x,y)\, dx\, dy$. For example, in the case of light transmitted through a weighted mask, detecting may be done by photovoltaic devices such as photocells (see FIGS. 4 and 26), which are preferably accompanied by some form of amplification. It is also within the scope of this invention to achieve the detecting step with the assistance of optical components such as lenses, prisms and the like, as well as using such well-known devices as photomultiplier tubes, electrodes, Geiger counters, and suitable electrical circuitry.

*Normalization*

Such detection will result in obtaining one or more signals (normally voltage signals). These signals may in themselves be used directly to represent the character or indicia being identified in those cases where normalization of the signals is not desired. Then they will be employed directly in the step of discriminating and comparing which leads to identification. However, all or a portion of the signals thus obtained may be normalized. Thus, in the flow diagram of FIG. 3, it will be seen that alternative routes are provided, and the signals may go either directly to the discriminator or through the normalizing step, or a portion may go one way and another portion the other.

For the purpose of this invention normalizing is defined as the step of computing by means of analytical transformations on a set of measurable signals a set of canonical values characteristic of the indicia and independent of at least one of the incidentals of its configuration.

In previous devices, certain types of transformation have been achieved to some degree; for example, it has been possible to enhance the image of a character by such transformations, but no truly practical means have previously been known for converting the signals to normalized canonical values which are characteristic of the indicia and independent of the incidentals (position, mass, minor variations in shape, orientation, etc.) of its configuration to the extent that it is possible in the process of this invention. However, in the practice of this invention complete normalization with respect to position, mass, rotation and scale, as well as other incidentals, is possible, thus overcoming the necessity for accurate registry and minimizing the effects of noise which might be introduced by the characters themselves.

Moreover, because of the Gestalt nature of the process of this invention, the effect of minor smudges, bright spots and other imperfections in the printing or paper, as well as noise, within the printing of a character is minimized. The noise which is thus minimized is that which may be due to poor printing which may tilt the letters, print unevenly, leave extraneous spots of ink, print too heavily, or too lightly or fail to completely cover the letter outline and the like.

It will be convenient to revert again to the example in which optical apparatus are used and masks which are capable of weighting the image according to polynomial functions are employed to obtain linear functions of the moments of the indicia to be identified. In the application of moments to identify information-bearing indicia, six illustrative intuitive properties of the shape of a character defined by its classical moments about its center of gravity will be presented.

FIGS. 16–22 are representations of seven capital letters in the Latin alphabet which will be used in the following discussion of moments. It will be appreciated that the area within the letter outline will normally be filled in with a color, generally black ink, but they are shown in this form for ease of presentation.

Figure 16:
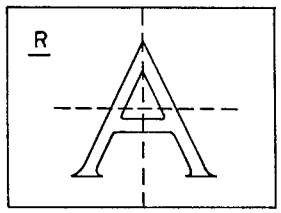
FIGS. 16–22 are typical capital letters of the Latin alphabet.
Figures 17, 18:
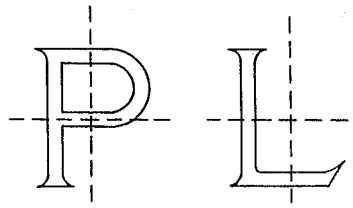
Figure 19:
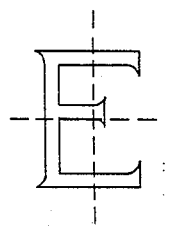
Figure 20:
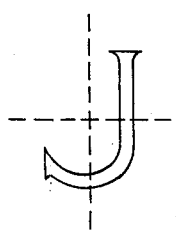
Figure 21:
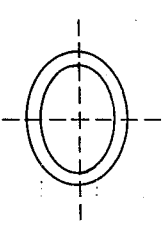
Figure 22:
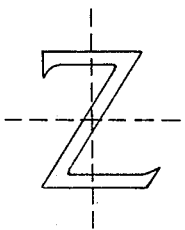

Let $\epsilon$ and $\eta$ represent characters located somewhere (but completely contained) in a region R (FIG. 16). The moments of the character may be defined in the classical sense. If the region R is rectangular (with coordinates from 0 to 1) and $\rho(x,y)$ is the density function of the character, say with $\rho(x,y)=0$ for white paper, $\rho(x,y)=1$ for complete ink coverage, then by definition:

$$M_x(i)_y(j) = \int_0^1 \int_0^1 x^i y^j \rho(x,y) dx\, dy \quad (15)$$

Several of these moments have well known interpretations.

$M_0(\xi)$ is the "weight" of $\xi$, i.e., the total amount of black in the letter. $M_x(\xi)$ is the first $x$ moment of $\xi$, the "lever" moment about the $x$ axis, while $M_y(\xi)$ is the first $y$ moment of $\xi$, the "lever" moment about the $y$ axis. $M_{xx}$ and $M_{yy}$ are the so-called "moments of inertia" and $M_{xy}$ is often referred to as the "product of inertia." The notation is continued in an analogous manner for the third and higher order moments:

$$M_{xxx}(\xi), M_{xxy}(\xi), M_{xyy}(\xi), M_{yyy}(\xi), \text{etc.}$$

These moments can be directly evaluated using, for example, the masks of FIGS. 6–8 and masks produced from them by application of addition or multiplication of two-dimensional density functions by techniques discussed in connection with the first step. Each of the moments is represented as a measured integral defined above as $$\iint \rho_I(x,y)\rho_{D_i}(x,y)dx\, dy$$

and each is then normalized, the normalized signals being used in the identifying step.

First, the measured moments can be normalized with respect to position of the letter in the region R. This involves a mathematical transformation of axes to a point which is a predetermined distance from the center of gravity of the letters—easily performed by using the fact that the coordinates $(\overline{X}, \overline{Y})$ of the center of gravity are given by $$M_x/M_0 = \overline{X} \text{ and } M_y M_0 = \overline{Y} \quad (16)$$

The moments, expressed about the center of gravity of the character, are given the diacritical superscript (+) to suggest their independence of the coordinate system. For example, the $x$ moment of inertia about the center of gravity will be denoted by $M^+_{xx}$.

The moments can also be normalized with respect to the "mass" of the character by dividing all moments by $M_0$. These mass-independent moments will be denoted by $\overline{M}$. Moments which have been normalized both with respect to position and mass will, of course, be denoted $\overline{M}^+$.

Normalization may be performed with respect to scale by making $M_{xx} + M_{yy} = 1$. Moments which have been normalized with respect to scale are identified by a diacritical superscript "0." Thus $M_{xxx}$, a measured value for the third $x$ moment becomes $\overline{M}^\oplus_{xxx}$ when normalized for mass, scale, and position. Normalization with respect to orientation may also be performed, but it is not pertinent to the description of intuitive properties defined by the classical moments of a shape of a character about its center of gravity.

The moments may be interpreted with reference to such properties of the character as imbalance, divergence, diagonality and centralness. A system of discriminating algorithms may then be used to represent or distinguish character from character. Typical algorithms for the characters of FIGS. 16–22 will be given as examples.

Imbalance is concerned with the relative location of the center of gravity of the character; divergence with the angularity of the periphery of the character; diagonality with the overall slope of the character; and centralness with the magnitude of the moments of inertia.

By using the notations $-$, 0, and $+$ a description system for characters was developed according to the following scheme shown in the tabulation below:

*Description system*

| Moment | Moment Functions | Basis | Degree | Rating | Examples (FIGS. 16–22) |
|---|---|---|---|---|---|
| Vertical imbalance | $\overline{M}^\oplus_{yyy}$ | Location of center of gravity with respect to half letter height. | Above At Below | − 0 + | P, E. O, Z. A, L, J. |
| Horizontal imbalance | $\overline{M}^\oplus_{xxx}$ | Location of center of gravity with respect to half letter width. | Right of At Left of | − 0 + | J. A, O, Z. P, E, L. |
| Vertical divergence | $\overline{M}^\oplus_{xxy}$ | Dimension of bottom compared to top. | Wider Same Narrower | − 0 + | A, L, J. E, O, Z. P. |
| Horizontal divergence | $\overline{M}^\oplus_{xyy}$ | Dimension at left compared to right. | Taller Same Shorter | − 0 + | P, L, E. A, O, Z. J. |
| Diagonality | $\overline{M}^\oplus_{xy}$ | View from center of gravity has more of letter in ___ quadrants. | 2d and 4th Same 1st and 3d | − 0 + | L, E. A, O. Z, P, J. |
| Vertical centralness | $M^+_{yy}$ | Determined by variance in the $y$ direction | | | |
| Horizontal centralness | $M^+_{xx}$ | Determined by variance in the $x$ direction | | | |

Using the examples of the letters illustrated in FIGS. 16–22, it is possible to assign a typical discriminating algorithm to each of the letters as follows:

*Moment functions*

| Letter | $M_{yyy}$ | $M_{xxx}$ | $M_{xxy}$ | $M_{xyy}$ | $M_{xy}$ |
|---|---|---|---|---|---|
| A | + | 0 | − | 0 | 0 |
| P | − | + | + | − | + |
| L | + | + | + | − | − |
| E | − | + | 0 | − | − |
| J | + | − | − | + | + |
| O | 0 | 0 | 0 | 0 | 0 |
| Z | 0 | 0 | 0 | 0 | + |

Continuing the example using moments, the output of the preceptor device might be the set of the first ten moment functions of the character $$M_0, M_x, M_y, M_{xx}, M_{xy}, M_{yy}, M_{xxx}, M_{xxy}, M_{xyy}, M_{yyy} \quad (17)$$

It will be appreciated that the greater the number of moment functions employed the more accurately the characters can be distinguished and the more flexible the character recognition method becomes.

In the normalizing procedure these moments may be made independent of the position of the character, the heaviness of the character, the scaling of the character, and lastly the orientation of the character if it is tilted.

The method of normalization can be extended to the cases when the perceptor measures linear combinations of moments instead of "pure" moments, thus making it possible to handle certain situations where moment measurements are not perfect. For example, if masks weighted as pure powers are not available with the necessary accuracy, such a method may be used to compensate for the imperfections. Using the normalizing process of this invention, it will often be possible to produce, for example, nearly exact normalized measurements even when some of the measuring masks are imperfect.

In normalizing for position, the measured moments will vary depending where the character is located within the region of measurement; and the purpose of the first normalization is the yield moments that are independent of the position of the letter as long as it lies entirely within the region. This normalization will greatly reduce the mechanical tolerances required for registration and will enable the reading of printed letters that are mispositioned above or below the line.

The normalization can, for example, most simply be achieved by a mathematical transformation of axes to the center of gravity of the letter being measured. The coordinates $(\overline{X}, \overline{Y})$ of the center of gravity are readily obtained from the measured moments according to Equation 16.

The translation formulas are well known ("+" indicates independence of axes):

$$M^+_0 = M_0 \tag{18}$$
$$M^+_x = 0$$
$$M^+_y = 0$$
$$M^+_{xx} = M_{xx} - 2\overline{X}M_x + \overline{X}^2 M_0$$
$$M^+_{xy} = M_{xy} - \overline{Y}M_x - \overline{X}M_y + \overline{X}\overline{Y}M_0$$
$$M^+_{yy} = M_{yy} - 2\overline{Y}M_y + \overline{Y}^2 M_0$$
$$M^+_{xxx} = M_{xxx} - 3\overline{X}M_{xx} + 3\overline{X}^2 M_x - \overline{X}^3 M_0$$
$$M^+_{xxy} = M_{xxy} - 2\overline{X}M_{xy} - \overline{Y}M_{xx} + \overline{X}^2 M_y + 2\overline{X}\overline{Y}M_x - \overline{X}^2\overline{Y}M_0$$
$$M^+_{xyy} = M_{xyy} - 2\overline{Y}M_{xy} - \overline{X}M_{yy} + \overline{Y}^2 M_x + 2\overline{X}\overline{Y}M_y - \overline{X}\overline{Y}^2 M_0$$
$$M^+_{yyy} = M_{yyy} - 3\overline{Y}M_{yy} + 3\overline{Y}^2 M_y - \overline{Y}^3 M_0$$

The information present in the orginal $M_x$ and $M_y$ moments is sacrificed in making the normalization, since $M^+_x = 0 = M^+_y$, so that only eight of the ten original quantities contain usable information after this normalization.

Obviously, normalization with respect to position can be accomplished electronically by analog computation of Formulas 17 and 18.

Normalization for mass yields measurements that do not depend on whether a character is printed heavily or lightly on the page, and do not depend on the color composition of the ink used.

The normalization for mass is accomplished by dividing all measurements by the mass $M_0$. For the example of moments, the normalized measurements after normalization for both mass and position are:

$$\overline{M}^+_0 = 1 \tag{20}$$
$$\overline{M}^+_x = 0$$
$$\overline{M}^+_y = 0$$
$$\overline{M}^+_{xx} = M^+_{xx}/M_0$$
$$\overline{M}^+_{xy} = M^+_{xy}/M_0$$
$$\overline{M}^+_{yy} = M^+_{yy}/M_0$$
$$\overline{M}^+_{xxx} = M^+_{xxx}/M_0$$
$$\overline{M}^+_{xxy} = M^+_{xxy}/M_0$$
$$\overline{M}^+_{xyy} = M^+_{xyy}/M_0$$
$$\overline{M}^+_{yyy} = M^+_{yyy}/M_0$$

Only seven variable quantities now remain since $\overline{M}^+_0$ always equals 1 after this normalization.

It may be desirable to normalize for scale and line thickness so that a large or bold version of a given character yields the same normalized moments as a small or thin version. The purpose of this normalization may be: to correct for errors in printing which tend to make a character thicker, thinner, bigger or smaller; to enable simultaneous reading of regular and boldfaced type; and to facilitate simultaneous reading of upper and lower cases by automatically identifying those characters which are the same in both cases except for scale.

To arrive at scale and thickness normalization it is necessary to reduce the mass-independent moments to dimensionless form. It is apparent that a moment $M_{ij}$ has dimensionality $i+j$, and to make it dimensionless it is necessary to divide it by some quantity with dimension $i+j$. This quantity must have the property that it is invariant under any further normalizations that might be performed. In particular, a remaining normalization is to orient tipped letters; i.e., one that provides for invariance of measurements under rotation about the center of gravity. The quantity $\tau^2 = \overline{M}^+_{xx} + \overline{M}^+_{yy}$ has the necessary invariant property, for $\tau^2$ is the moment of inertia of the character about an axis through the center of gravity and perpendicular to the paper. To normalize $M_{ij}$, then it may be divided by $\tau^{i+j}$. Written out, the moments normalized for position, mass, scale and line thickness are:

$$\overline{M}^\oplus_0 = 1 \tag{21}$$
$$\overline{M}^\oplus_x = 0$$
$$\overline{M}^\oplus_y = 0$$
$$\overline{M}^\oplus_{xx} = \overline{M}^+_{xx}/\overline{M}^+_{xx} + \overline{M}^+_{yy}$$
$$\overline{M}^\oplus_{xy} = \overline{M}^+_{xy}/\overline{M}^+_{xx} + \overline{M}^+_{yy}$$
$$\overline{M}^\oplus_{yy} = \overline{M}^+_{yy}/\overline{M}^+_{xx} + \overline{M}^+_{yy}$$
$$\overline{M}^\oplus_{xxx} = \overline{M}^+_{xxx}(\overline{M}^+_{xx} + \overline{M}^+_{yy})^{-3/2}$$
$$\overline{M}^\oplus_{xxy} = \overline{M}^+_{xxy}(\overline{M}^+_{xx} + \overline{M}^+_{yy})^{-3/2}$$
$$\overline{M}^\oplus_{xyy} = \overline{M}^+_{xyy}(\overline{M}^+_{xx} + \overline{M}^+_{yy})^{-3/2}$$
$$\overline{M}^\oplus_{yyy} = \overline{M}^+_{yyy}(\overline{M}^+_{xx} + \overline{M}^+_{yy})^{-3/2}$$

Again, some information is sacrified in order to effect this normalization. Only six usable components are left since $$\overline{M}^\oplus_{xx} + \overline{M}^\oplus_{yy} = 1$$

and one of these components is therefore redundant.

Absolute scale characteristics may sometimes be useful for recognition, for instance, in order to differentiate an upper case "O" from a lower case "o." Thus it may be desirable to supply the $\overline{M}^+_{xx}$ and $\overline{M}^+_{yy}$ moments as outputs from the normalizer as they appear before scale normalization.

Finally, normalization for orientation of a character about its center of gravity makes it possible to identify accidentally tipped characters.

To establish the rotation formulas it is seen that for rotation of axes through an angle $\theta$, where $\alpha = \cos \theta$, $\beta = \sin \theta$.

$$X' = \alpha X + \beta Y \tag{22}$$
$$Y' = -\beta X + \alpha Y$$

and $$M_{ij} = \iint X'^i Y'^j \rho(x,y) \, dx \, dy \tag{23}$$

Now the invariants under rotation may be written as $$\tilde{M}_{xx} + \tilde{M}_{yy} = M_{xx} + M_{yy} \tag{24}$$
$$M_{xx}M_{yy} - \tilde{M}^2_{xy} = M_{xx}M_{yy} - M^2_{xy}$$

which means for a rotation to principal axes, i.e., a rotation chosen to make $\tilde{M}_{xy} = 0$ $$\mu = \tan \theta = \frac{M_{yy} - M_{xx} \pm \sqrt{(M_{yy} - M_{xx})^2 + 4M^2_{xy}}}{2M_{xy}} \tag{25}$$

where $$\alpha = \frac{\pm 1}{\sqrt{1+\mu^2}} \qquad \beta = \pm\sqrt{1-\alpha^2} \tag{26}$$

The normalization is accomplished by computing $\mu$, $\alpha$ and $\beta$ from Formulas 25 and 26, and then substituting the results into the rotation formula given by 23 yielding for moments normalized for position, mass, scale, line thickness and orientation:

$$\widetilde{M}^{\oplus}_0 = 1 \qquad (27)$$
$$\widetilde{M}^{\oplus}_x = 0$$
$$\widetilde{M}^{\oplus}_y = 0$$
$$\widetilde{M}^{\oplus}_{xx} = \alpha^2 \overline{M}^{\oplus}_{xx} + 2\alpha\beta \overline{M}^{\oplus}_{xy} + \beta^2 \overline{M}^{\oplus}_{yy}$$
$$\widetilde{M}^{\oplus}_{xy} = 0$$
$$\widetilde{M}^{\oplus}_{yy} = \beta^2 \overline{M}^{\oplus}_{xx} - 2\alpha\beta \overline{M}^{\oplus}_{xy} + \alpha^2 \overline{M}^{\oplus}_{yy}$$
$$\widetilde{M}^{\oplus}_{xxx} = \alpha^3 M^{\oplus}_{xxx} + 3\alpha^2\beta \overline{M}^{\oplus}_{xxy} + 3\alpha\beta^2 \overline{M}^{\oplus}_{xyy} + \beta^3 \overline{M}^{\oplus}_{yyy}$$
$$\widetilde{M}^{\oplus}_{xxy} = -\alpha^2\beta M^{\oplus}_{xxx} + \alpha\beta^2 \overline{M}^{\oplus}_{yyy}$$
$$+ (\alpha^3 - 2\alpha\beta^2) \overline{M}^{\oplus}_{xxy} - (\beta^3 - 2\alpha^2\beta) \overline{M}^{\oplus}_{xyy}$$
$$\widetilde{M}^{\oplus}_{xyy} = \alpha\beta^2 \overline{M}^{\oplus}_{xxx} + \alpha^2\beta \overline{M}^{\oplus}_{yyy}$$
$$+ (\beta^3 - 2\alpha^2\beta) \overline{M}^{\oplus}_{xxy} + (\alpha^3 - 2\alpha\beta^2) \overline{M}^{\oplus}_{xyy}$$
$$\widetilde{M}^{\oplus}_{yyy} = -\beta^3 \overline{M}^{\oplus}_{xxx} + 3\alpha\beta^2 \overline{M}^{\oplus}_{xxy} - 3\alpha^2\beta \overline{M}^{\oplus}_{xyy} + \alpha^3 \overline{M}^{\oplus}_{yyy}$$

Since $\widetilde{M}^{\oplus}_{xy} = 0$ and it is still the case that $$\widetilde{M}^{\oplus}_{xx} = \widetilde{M}^{\oplus}_{yy} = 1$$

only five independent and variable components are left after this normalization.

Thus it is possible to achieve computational normalization of moments for position, mass, scale and line thickness, and orientation of characters. The equations for the first three normalizations are simple and straightforward; the equations for the last normalization are more complex, but also straightforward. They all may be solved by standard techniques of automatic computation such as by the use of any suitable analog computer (see for example Albert S. Jackson, "Analog Computation," McGraw Hill Book Company, New York, 1960).

In the reading of practical fonts the normalizations for position and mass will generally be required. The normalizations for scale and line thickness and for orientation may prove quite useful, but they may be dispensed with in simple reading devices for certain applications.

All of the normalizations may of course be approximated by formulas simpler than those exhibited in the course of the illustrative discussion treating moments, and use of such simpler formulas is within the scope of the process of this invention.

Continuing the example based on the measurements of moments, the results of the preceding mathematical analysis may be generalized to enable normalization of measurements which are linear functions of moments. Moreover, the signals resulting from normalization may themselves be made normalized linear functions of moments designed to facilitate discrimination. These generalizations are desirable because of a number of practical considerations; for example, masks used to measure input may be imperfect and only approximately represent moment weighting functions. Another possibility is that it might be desirable for purposes of error control to use certain functions of normalized moments rather than the moments themselves for input to the discriminator. The mathematics of these generalized transformations can now be developed; then examples will be given.

Let M be a 10 dimensional row vector of non-normalized moments as defined by 17. The transfromation matrix N which normalizes M for position is then defined by the coefficients appearing in Equations 18, and 18 can be written $$M^+ = MN \quad \text{Note } N = N(M_0, M_x, M_y) \qquad (28)$$

Similarly, 20 can be written $$\overline{M}^+ = M^+ R \quad \text{Note } R = R(M^+_0) \qquad (29)$$

where R is the diagonal mass-normalizing matrix defined by the coefficients in 20. The scale normalization 21 can be written $$\overline{M}^{\oplus} = \overline{M}^+ S \quad \text{Note } S = S(\overline{M}^+_{xx}, \overline{M}^+_{yy}) \qquad (30)$$

Finally, the orientation normalization 27 can be written:

$$\widetilde{M}^{\oplus} = \overline{M}^{\oplus} \theta \quad \text{Note } \theta = \theta(\overline{M}^{\oplus}_{xx}, \overline{M}^{\oplus}_{xy}, \overline{M}^{\oplus}_{yy}) \qquad (31)$$

The composite normalization is then:

$$\widetilde{M}^{\oplus} = MNRS\theta = MT \qquad (32)$$

where $T = T(M_0, M_x, M_y, M_{xx}, M_{xy}, M_{yy})$.

Now assume that the measurements made by the perceptor are not pure moments, but rather are linear functions of moments $f_j$.

Specifically, it will be assumed that the perceptor furnishes the ten outputs:

$$f_j = A_j + \sum_{j=1}^{10} m_i b_{ij} \text{ for } 1 \leq j \leq 10 \qquad (33)$$

where the $m$'s are the components of M given by 17. It has been assumed here that the outputs are linear functions of moments no higher than the third order; it is now assumed also that the perceptor outputs are linearly independent, i.e., assume $B = \{b_{ij}\}$ to be nonsingular. Then restating 33 we have in matrix terminology $$F = A + MB, \quad M = (F - A)B^{-1} \qquad (34)$$

which enables a normalization back to the moments provided that A and B are known.

The optical techniques presented as the first step of this invention can be used to measure moments of characters directly using transparent characters on opaque backgrounds. When black characters are being recognized on white paper using reflected light, however, the situation becomes slightly more complex; what is measured is the moments of the white paper surrounding the letter rather than the moments of the letter itself. If the intensity of light reflected from a character can vary from 0 to 1 (0 for absolute ink coverage, 1 for clear white paper) then passing this light through moment weighting masks we obtain as measurements:

$$L_{ij} = \iint x^i y^j (1 - \rho(x, y)) dx dy \qquad (35)$$

The moments of the letter are then given by:

$$\begin{aligned}
M_0 &= 1 - L_0 & M_{yy} &= 1/3 - L_{yy} \\
M_x &= 1/2 - L_x & M_{xxx} &= 1/4 - L_{xxx} \\
M_y &= 1/2 - L_y & M_{xxy} &= 1/6 - L_{xxy} \\
M_{xx} &= 1/3 - L_{xx} & M_{xyy} &= 1/6 - L_{xyy} \\
M_{xy} &= 1/4 - L_{xy} & M_{yyy} &= 1/4 - L_{xxx}
\end{aligned} \qquad (36)$$

These formulas provide a specific and important example of a transformation of the form of Equation 34. 36 can be written
$M = K - L$ where $$K = (1, 1/2, 1/2, 1/3, 1/4, 1/3, 1/4, 1/6, 1/6, 1/4) \qquad (37)$$

The correction 37 for dark letters on a light background can be expressed along with the other normalizations of 32 giving $$\overline{M}^{\oplus} = (K - L)NRS\theta = (K - L)T \qquad (38)$$

Thus, it is seen that the type of normalization achieved in the process of this invention facilitates the reading of dark characters on light backgrounds.

Finally, it may be shown that the type of normalization achieved by the process of this invention may be used to correct for minor errors and imperfections in masks. It will be assumed that (a) the perceptor is supposedly measuring the moments in M (or, in the case of black-on-white, the elements of L), and (b) the masks do not contain errors which introduce moment measurements of higher than the third order. Then (for white on black) the conditions of Equation 33 hold with the $A_j=0$ and:

$$f_j = \sum_{j=1}^{10} m_i b_{ij}, \text{ where } b_{ii} \approx 1$$

and the $b_{ij}$ for $i \neq j$ represent small errors, so B is nonsingular. We then have from Equation 34

$$M = FB^{-1} \quad (39)$$

Thus, if B is known it is possible to transform the imperfect measurements into perfect ones. However, these errors are not usually known prior to calibration of the device, and therefore the matrix B is unknown prior to such calibration. A simple calibration process for finding $B^{-1}$ is however available.

After the perceptor with imperfect masks is built, it is calibrated as follows: ten geometric patterns with known moment vectors $\hat{M}_k$ ($1 \leq k \leq 10$) are used for calibration. The patterns are designed so that the $\hat{M}_k$ are linearly independent. As each pattern $k$ is placed in the perceptor, the signal $\hat{F}_k$ appears as the output of the perceptor:

$$\hat{M}_k = \hat{F}_k B^{-1} \quad (1 \leq k \leq 10) \quad (40)$$

These ten equations are equivalent to a single matrix equation:

$$\hat{M} = \hat{F} B^{-1} \quad (41)$$

where the $k$th row of $\hat{M}$ is $\hat{M}_k$ and the $k$th row of $\hat{F}$ is $\hat{F}_k$. $\hat{F}$ must be nonsingular since both $\hat{M}$ and $B^{-1}$ are nonsingular, and therefore:

$$B^{-1} = \hat{F}^{-1} \hat{M} \quad (42)$$

To find $B^{-1}$, then it is necessary to determine the $\hat{F}_k$ corresponding to each known test pattern $M_k$. Once the matrix inversion and multiplication shown in 42 are performed to obtain $B^{-1}$ the calibration calculation 42 remains constant for the design of a given set of masks. As has been seen from the above discussion, such knowledge of $B^{-1}$ enables correction of measurements made with imperfect masks.

If the linear $M_x$ and $M_y$ masks are known to be fairly accurate, the correction $B^{-1}$ from imperfect moments to perfect ones can be effected simultaneously with the normalization for position. Thus, substituting 39 into 32 we get:

$$M = FB^{-1}$$
$$MNRS\theta = FB^{-1}T = FT' = \overline{M} \oplus \quad (43)$$

Since $B^{-1}$ is a constant matrix, apparatus components need be provided in the machine only for the product transformation $B^{-1}N$.

The examples of the normalizing steps given above have all been directed to the use of polynominal weighting functions and linear transformations of these as inputs to the normalizer. The same algebraic techniques are applicable, however, to linear functions of moments as outputs from the normalizer. The matrix techniques given above are readily extended to this case. For purposes of optimum discrimination in the presence of noise, for example, it may be desirable to furnish as inputs to the normalizer measurements obtained from a set of masks weighted as orthogonal functions defined over the original optical plane.

A treatment analogous to that given here can be carried out to the same depth and breadth with trigonometric weighting functions and exponential weighting functions, and the normalization of the signals obtained through the use of these weighting functions is within the scope of this invention.

*Identification*

The output signal or signals resulting from the normalization step, the signal or signals transmitted directly from the obtaining of the set of measuring integrals, or signals representing a combination of these two types of signals, must then be subjected to the final step which is a combination of discriminating, comparing and identifying. These steps can be considered as the single step of identification and they are performed by the discriminator/comparator (FIG. 1) a typical apparatus being that shown in FIG. 25 discussed below.

Since either unnormalized, normalized or a mixture of unnormalized and normalized signals will be treated similarly in the identifying step, normalized input signals will be used in the description of the following example to illustrate, but not to limit, this step of identification. As will be discussed below, identification need not be directed to recognition of specific characters, character by character. It may generate other types of information. Since, however, most pattern recognition methods (as is this one) are designed to sense and identify individual indicia, this type of identification (which is generally the most precise) will be used in the following example, with the indicia to be identified being referred to as characters. The purpose of this example is to characterize four types of discrimination algorithms that may be used in the process of the identification step of this invention. The manner in which this identification step is carried out need not, however, be confined to the use of these algorithms.

Assume to begin with that the input to the discriminator is a vector $\vec{V}$ consisting of $n$ voltage signals representing the normalized measurements for a character being read. As in the example above directed to moment functions, this vector could be composed of the six independent moments after normalization for position, darkness of print, scale and line thickness.

$$\vec{V} = \overline{M} \oplus = \{\overline{M} \oplus_{xy}, \overline{M} \oplus_{yy}, \overline{M} \oplus_{xxx}, \overline{M} \oplus_{xxy}, \overline{M} \oplus_{xyy}, \overline{M} \oplus_{yyy}\} \quad (44)$$

However, the exact meaning of these measurements is unimportant for it could just as well be assumed that they represent linear combinations of moments, Fourier or Legendre coefficients, or, for that matter, any other set of measurements that describe characters.

For the purpose of this example, the recognition device will be presumed to be capable of recognizing a fixed number $n$ of characters or other patterns. Thus the 62 characters of the upper case, lower case and numerals of the Metro Thin No. 2 font can be used as the $n$ characters to be recognized. Normalized vectors $\vec{W}_i$ for "perfect" noise-free versions of each character are determined. The vector $\vec{W}_i$ will be called hereinafter the "canonical vector" for the $i$th character and for clarity of presentation and illustration will be taken to be that for a perfect noise-free version of that character.

Figure 23:
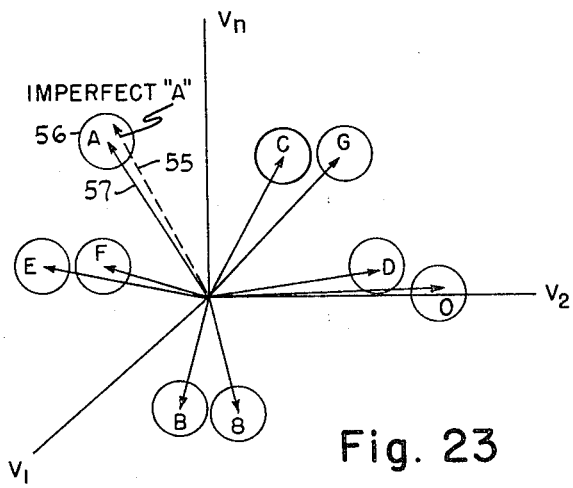
FIG. 23 illustrates the use of canonical vectors to represent perfect characters.

These canonical vectors are schematically illustrated in FIG. 23 wherein the vectors are drawn in three-dimensions with coordinates $v_1$, $v_2$, and $v_3$, although higher dimensional spaces may be used. Discrimination between two characters is possible only if the various canonical vectors $\vec{W}_i$ are different. It will be seen that for recognition to be possible the outputs of the normalizer must be such that ordinary variations in printing, ordinary amounts of noise and ordinary measurement errors lead to small displacements of measurement vectors from the corresponding canonical vectors. That is, displacements due to noise or errors must be small compared to distances between canonical vectors. As long then as the end-point of a measurement vector falls within boundaries associated with the corresponding canonical vector, the character can be accurately recognized. In FIG. 23 the vector 55 for an imperfect "A" still falls within a sphere 56 about the canonical "A" vector 57, even though the "A" being examined may have noise associated with it or close to it. If unambiguous recognition of characters in the presence of noise is sought, there must be no overlapping of the regions associated with these canonical vectors.

The function of the discriminating portion of the identifying step can be stated simply in terms of the vector model. Given a measurement vector $\vec{V}$ representing an unknown character, discriminating either identifies it with some canonical vector (defining the character), or, alternately, indicates that no satisfactory identification is possible.

The first type of discriminant algorithm to be described is based on the measurement of distances in multidimensional vector spaces. Since noise may affect any of the three coordinates, the noise or error about the end-point of a canonical vector 57 in the representation of FIG. 23 may be presumed to be spherically symmetric and a decaying function of distance from the point. Therefore the distance relationship between measurement vectors becomes a valid criterion for discrimination. The distance between an unknown vector $\vec{V}$ and any given canonical vector $\vec{W_i}$ is, of course:

$$D(\vec{V}, \vec{W_i}) = \sqrt{\sum_{j=1}^{n}(V_j - W_{ij})^2} \quad (45)$$

A "quadratic" discriminant algorithm then provides that an unknown measurement vector $\vec{V}$ is to be identified with the closest canonical vector. That is, a vector $\vec{V}$ is to be identified with the character $i$ for which $D(\vec{V}, \vec{W_i})$ is minimum.

Figure 24:
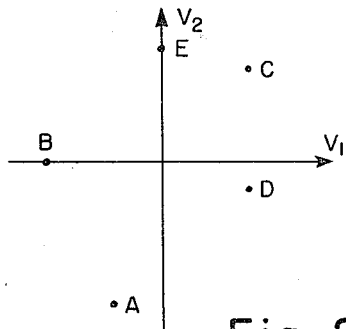
FIG. 24 illustrates the use of hyperplane algorithms for discriminating between vector representations of characters.

Another type of discriminant algorithm usable in the practice of this invention is based on the use of three-valued decisions depending upon the size of each of the components of $\vec{V}$. With reference to FIG. 24, it is possible to draw hyperplanes normal to the individual coordinate axes, and then to subsequently determine whether a measurement falls nearly on a hyperplane, or clearly is on one side (+) or the other (−) of it. To illustrate this, consider the two-dimensional diagram of FIG. 24, where the decision hyperplanes are the $v_1$ and $v_2$ axes.

The points designated by selected letters in FIG. 24 are characterized as follows:

| Letter | $v_1$ | $v_2$ |
|--------|-------|-------|
| A | − | 0 |
| B | − | + |
| C | + | + |
| D | + | − |
| E | 0 | + |

It will be seen that a dirty or noisy version of "B" resulting in a negative $v_2$ might cause misidentification with "A." This difficulty is overcome by passing error-bounding hyperplanes around each decision hyperplane. However, it is necessary to pass a great number of hyperplanes through the space in order to assume stability of decisions in the presence of noise. Using this type of discriminant algorithm has the advantage that the apparatus for its use is simple and relatively inexpensive. However, each font requires a different algorithm and changing only a few characters of a given font might require establishing a completely new algorithm.

While the first algorithm described above, the quadratic discriminant algorithm, is based on the use of spherical neighborhoods about canonical vector end-points, a third "rectangular neighborhood" type of algorithm can be constructed which is based instead on the use of n-dimensional boxes, having their centers at the canonical vector end-points. A measured vector is identified with the "A" vector if its end-point falls within the box about A, etc. Analytically, this corresponds to stating that for each canonical vector $\vec{W_i}$ we define a tolerance vector $\vec{E_i} = [E_{i_1}, E_{i_2}, \ldots E_{i_n}]$ where the lengths of the edges of the box about $\vec{W_i}$ are given by $2E_i$. Then a measured vector $\vec{V}$ is to be identified with $W_i$ provided that $$/V_j - W_{ij}/ < E_{ij} \text{ for } j = 0, 1 \ldots n \quad (46)$$

which is the same as saying that $\vec{V}$ lies within the box about $W_i$.

The rectangular neighborhood algorithm offers several advantages. First of all, it gives an approximation of the "optimal" quadratic algorithm. It allows a somewhat more complex partitioning of the space than that possible using the quadratic function, for the edges of the hyper-boxes need not have the same lengths.

Figure 25:
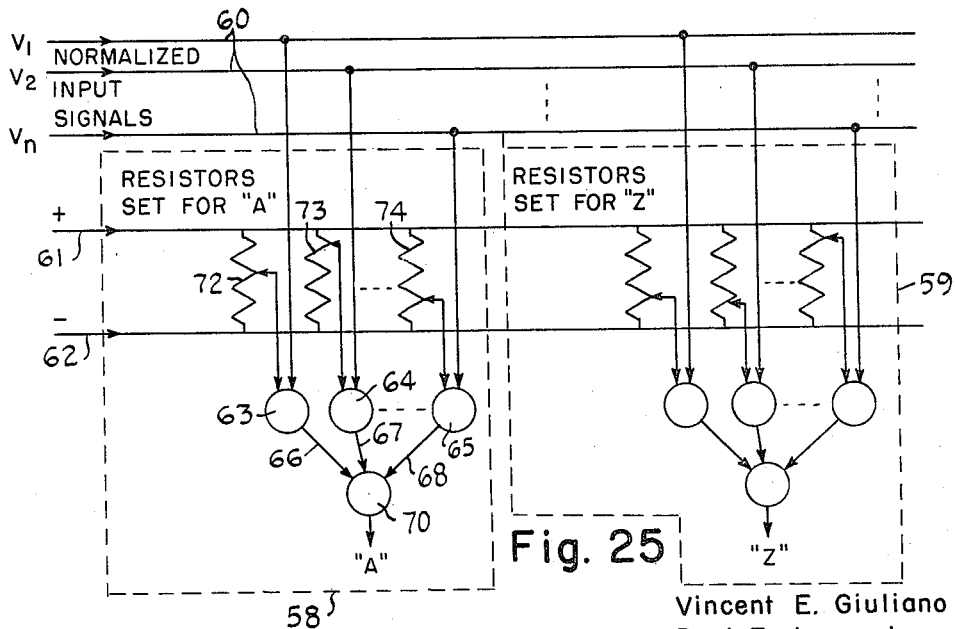
FIG. 25 illustrates a typical circuit for identification.

The principle of operation of a circuit that applies the "rectangular neighborhood" algorithm is illustrated in FIG. 25 which is a suitable discriminator-comparator serving as the means for comparing signals with predetermined signals. The circuit is modular and adjustable for any font of characters. Typical modules 58 and 59 are shown only for "A" and "Z." The normalized and unnormalized signals for an unknown character enter via the $n$ wires 60 shown on the top of FIG. 25. The number $n$ will be fairly small—say $n=7$. The two other horizontal wires 61 and 62 shown in FIG. 25 carry fixed voltages.

A module for a given character consists of 7 tapped resistors (3 of which are shown at 72, 73 and 74) seven voltage comparison circuits (3 of which are shown as 63, 64 and 65), and an "and" gate 70 with seven inputs (3 of which are shown as 66, 67 and 68). A similar circuitry is provided for the "Z" and each other character to be recognized. The 7 tapped resistors are set to provide the canonical reference signals for the character to be detected by the module concerned. The comparison circuits serve to compare the canonical voltages with the measured voltages. They have binary outputs; a typical comparison circuit is triggered only if the difference of the input voltages is less than a predetermined amount. In fact, comparison circuit $j$ in module $i$ is triggered if and only if Equation 46 is satisfied. The "and" gate 70 produces its output only when all 7 comparison circuits fire, i.e., only when the measured vector $\vec{V}$ falls within the "box" about the canonical vector given by the resistor voltages $\vec{W_i}$ and the tolerances $\vec{E_i}$.

The modularity of the circuit of FIG. 25 has distinct advantages. To change from one font to another, it is necessary only to change the resistor settings. Thus the apparatus and method of this invention can offer great flexibility with respect to fonts to be sensed and recognized.

Figure 26:
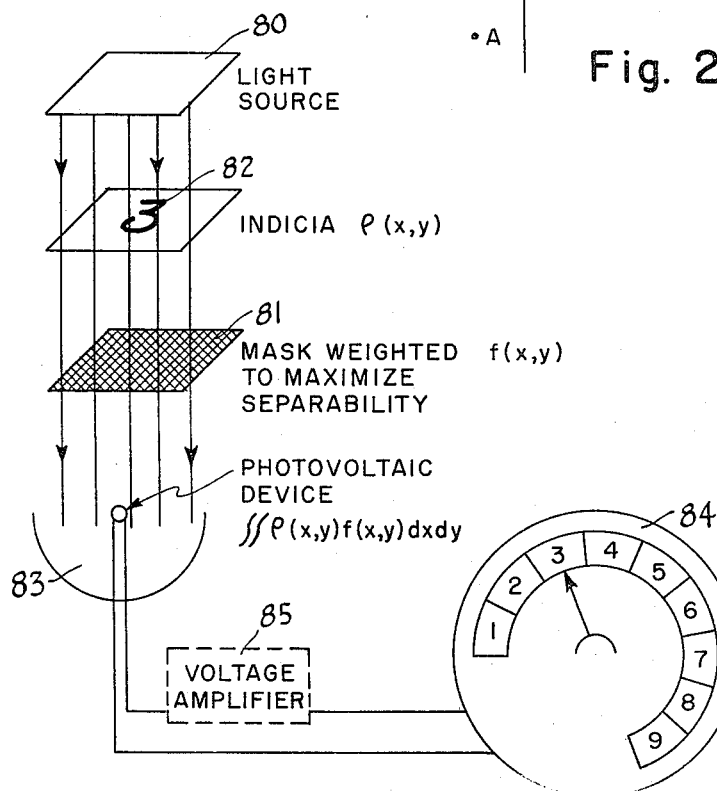
FIG. 26 illustrates a character recognition system embodying the use of a linear discriminant function.

A fourth type of discriminating algorithm is based on the projection of $n$-dimensional points in the vector space of V onto an $n$-$p$ dimensional linear manifold. For example, projection might be onto a line, with orientation determined so as to optimize separability of the projections of the canonical points. One embodiment of an apparatus based on the use of this principle is illustrated in FIG. 26. It will be seen to consist essentially of a light source 80, a mask 81 designed to maximize separability for the character 82 to be recognized, a photovoltaic device 83, and a voltage measuring device 84, accompanied by amplification 85 if desired.

In the use of automatic character recognition devices it may not always be required to identify character by character, but to be able to recognize certain common characteristics of a set of input shapes or indicia. For example, as a first step of a problem in translating it may be desirable to recognize only differences in alphabets, e.g., Latin, Cyrillic, Arabic or Japanese. Likewise in map reading or chart examination, it may be desired to determine the presence of predetermined geographical configurations or of predetermined types of graphical representations. By setting up standards for comparison and recognitions which are indicative of certain distinctive characteristics of the indica, the identifying step will recognize the presence or absence of these standards.

The signals identifying the characters or patterns resulting from the identification step may be stored on punched cards, punched tape, magnetic tape or some other medium, or may be used to actuate a device like a typewriter, a transmitter or to activate some machine for any other purpose required.

Figure 27:
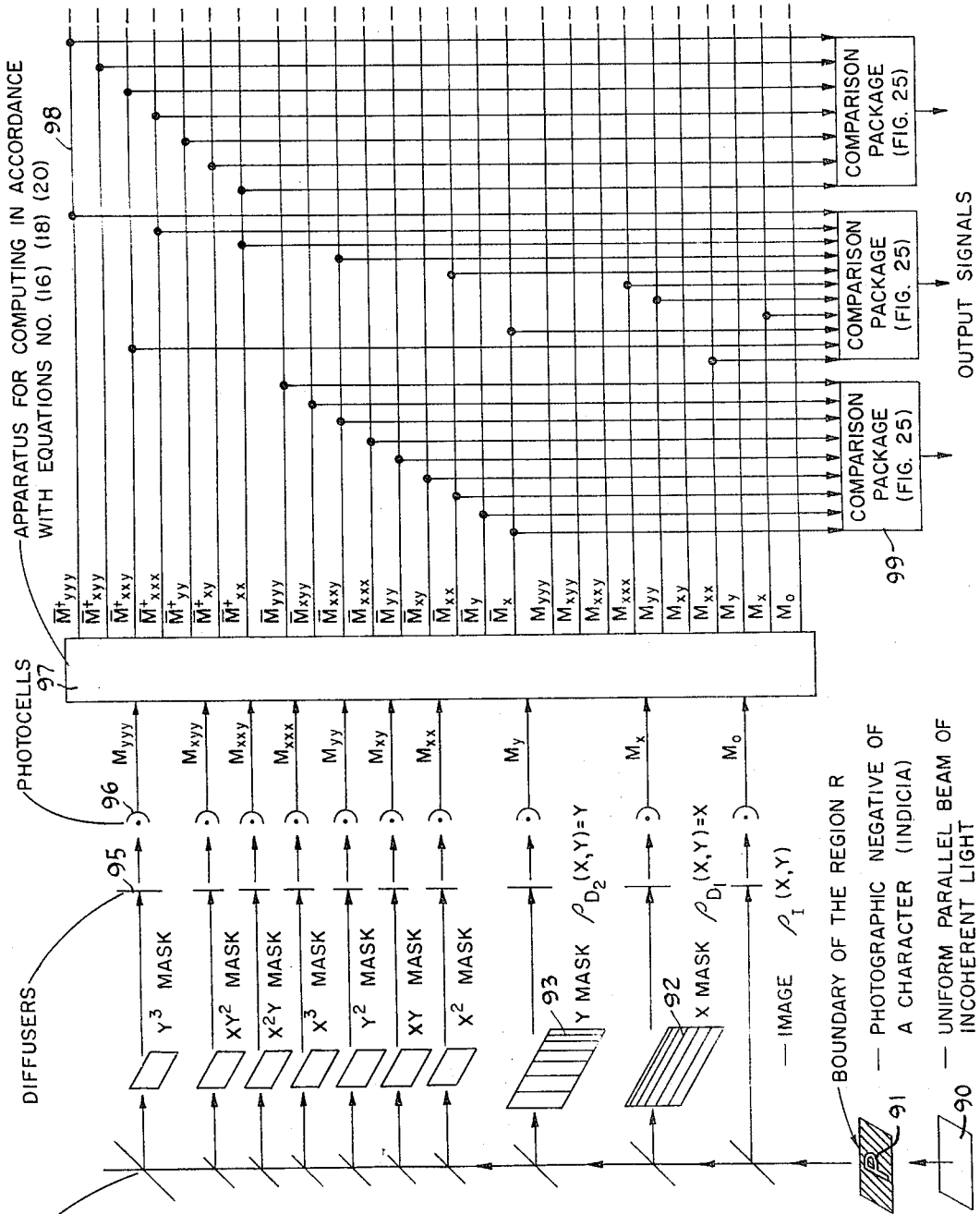
FIG. 27 illustrates a typical character recognition apparatus according to this invention.

FIG. 27 illustrates a particular embodiment of apparatus for use in a device for recognizing printed characters of a predetermined font. The illustration shows the perceptor, normalizer, and discriminator/comparator of FIG. 1 in more detail. It is assumed in this example that the indicia are presented in the form of photographic negatives, the indicia to be recognized appearing as transparent shapes on an opaque background.

The apparatus which will be discussed with respect to FIG. 27 embodies the features of several illustrative examples which have been developed in the course of this presentation. Thus, a parallel beam of incoherent light is used as the energy source 90, printed characters such as alphabetic letters and numerals and punctuation marks serve as the indicia 91 to be recognized, photographic transparencies 92 and 93 of varying optical density are used as the selective attenuating means, the image $\rho_I(x, y)$ is manifested as a two-dimensional distribution of light intensity, superposition of the mask and the image is employed to form the product image $\rho_I(x, y)\rho_{D_i}(x, y)$, a diffuser 95 and photocell 96 arrangement serve to effect the measurement of the integral $\iint \rho_I(x, y)\rho_{D_i}(x, y)dxdy$ and to accomplish the step of detecting by expressing this measurement in terms of a measurable voltage, the normalizer 97 is conceived as any suitable analog computing circuitry appropriate to the measured voltages (see Jackson, "Analog Computation" previously referenced), the outputs of the normalizer 97 are schematized as voltages on a bus such as 98, these voltage being tapped by an appropriate number of comparison packages 99 of the type illustrated in FIG. 25.

This particular embodiment furthermore is shown in FIG. 27 as a device which measures the moments as defined by Equations 10 and 17 and utilizes the procedures described by Equations 16, 18 and 20 to obtain the normalized voltages which appear on the bus. Additional normalizations, such as those described by Equation 21, could also be included, but the normalizations used in the diagram (for mass and for mass and position) are among the most important in recognizing characters. It should be evident from the diagram and from the discussion of alternative weighting functions $\rho_{D_i}(x, y)$ and alternative normalizing formulas that analogous embodiments can be expressed by a substitution of different masks and different normalizing equations in FIG. 27.

It should be noted that in a practicable device for the reading of printed characters by the method of this invention it is desirable to include a means of sequencing the introduction of images into the perceptor. For this purpose, the feedback of information from the output signals can be used to advantage. In addition, the feedback of information from the output of the comparison package, from the bus, or both may also be used to control the dimensions of the region R in order to insure that at least one indicia is completely contained in R. These auxiliary devices, however, are not essential to the process of this invention.

It will be seen from the above description that this invention provides novel method and apparatus for character recognition which achieve the objects set forth. It will be appreciated that considerable modification is possible in the manner in which the steps of the method are carried out as well as in the components of the apparatus without departing from the essential features and scope of this invention.

We claim:

1. An apparatus for identifying information-bearing indicia, the image of which can be represented as a two-dimensional density function $\rho_I(x,y)$, comprising in combination
  (a) a set of selective energy attenuating systems which weight said image according to a set of two-dimensional, continuously varying discriminant density functions $\rho_{D_i}(x,y)$, independent of $\rho_I(x,y)$, at least one of which is nonconstant in at least one dimension;
  (b) means for directing an energy manifestation image of said indica $\rho_I(x,y)$ through said selective energy attenuating systems so as to obtain a set of product images $\rho_I(x, y)\rho_{D_i}(x, y)$ of said density function;
  (c) means for detecting a proportional fraction of the total energies transmitted through each of said systems, each of said total energies being represented as a fraction of an area integral $$\iint \rho_I(x, y)\rho_{D_i}(x, y)dx\, dy$$

so as to obtain a set of measurable signals representative of said area integrals; and
  (d) means for comparing said signals with a set of predetermined signals so as to identify said indicia with a known indicia.

2. An apparatus in accordance with claim 1 including means for normalizing said set of measurable signals to canonical representations of said set of measurable signals.

3. An apparatus in accordance with claim 1 wherein said means for directing said energy manifestation image includes polarized light and said attenuating systems include polarized filters.

4. An apparatus for identifying information-bearing indicia, the image of which can be represented as a two-dimensional density function $\rho_I(x, y)$, comprising in combination
  (a) a set of selective energy attenuating systems which weight said image according to a set of two-dimensional, continuously varying discriminant density functions $\rho_{D_i}(x, y)$, independent of $\rho_I(x, y)$, at least one of which is nonconstant in at least one dimension;
  (b) means for directing an image of said indicia $\rho_I(x,y)$ through said selective energy attenuating systems so as to obtain a set of product images $\rho_i(x, y)\rho_{DI}(x, y)$ of said density functions;
  (c) means for detecting a proportional fraction of the total energies transmitted through each of said systems, each of said total energies being represented as a fraction of an area integral $$\iint \rho_I(x, y)\rho_{D_i}(x, y)dx\, dy$$

so as to obtain a set of measurable signals representative of said integrals;
  (d) means for normalizing said set of measurable signals with respect to at least one possible variant selected from the group consisting of position, mass rotation and scale of said indicia so as to obtain a set of normalized voltage values; and
  (e) means for comparing said set of normalized voltage values with a set of predetermined voltages to identify said indicia with a known indicia.

5. An apparatus for identifying information-bearing indicia, the image of which can be represented as a two-dimensional density function $\rho_I(x, y)$, comprising in combination
  (a) a set of optical filtering systems which weight said image according to a set of two-dimensional, continuously varying discriminant density functions $\rho_{D_i}(x, y)$, independent of $\rho_I(x, y)$, at least one of which is nonconstant in at least one dimension;
(b) means for directing an image of said indicia $\rho_I(x, y)$ through said optical filtering systems so as to obtain optically a set of product images of $\rho_I(x, y)\rho_{D_i}(x, y)$ of said density functions;
(c) means for detecting a proportional fraction of the total light transmitted through each of said optical filtering systems, each of said total energies being represented as a fraction of an integral $$\iint \rho_I(x, y)\rho_{D_i}(x, y)dx\, dy$$

as weighted by said optical filtering system so as to obtain a set of measurable signals representative of said integrals;
(d) means for normalizing said set of signals with respect to at least one possible variant of said indicia so as to obtain a set of normalized values; and
(e) means for comparing said normalized values with a set of predetermined values thereby to identify said indicia with a known indicia.

6. An apparatus in accordance with claim 5 wherein said set of optical filtering systems comprise at least one mask which weights said image according to an analytic weighting function of two variables such that said integral associated with each of said masks represents a coefficent in a mathematical two-dimensional series expansion of the function $\rho_I(x, y)$ representing said indicia.

7. An apparatus in accordance with claim 5 wherein said set of optical filtering systems comprises at least one mask which weights said image according to a polynominal weighting function such that said integral associated with each of said masks represents a linear function of the moments of said indicia.

8. An apparatus in accordance with claim 5 wherein said set of optical filtering systems comprises at least one mask which weights said image according to a trigonometric weighting function such that said integral associated with each of said masks represents a Fourier coefficient in the Fourier series expansion of said indicia.

9. An apparatus in accordance with claim 5 wherein said set of optical filtering systems comprises at least one exponential weighting mask generated by variable-density wedge-shaped filters.

10. An apparatus in accordance with claim 5 wherein said set of optical filtering systems comprises at least one weighting function selected from the group consisting of polynomial, trigonometric, exponential and combinations thereof.

11. An apparatus for identifying information-bearing indicia, the image of which can be represented as a two-dimensional density function $\rho_I(x,y)$, comprising in combination
(a) a set of filtering systems, including a set of light sources, comprising slits which weight a cross-section of said image according to a set of one-dimensional discriminant density functions;
(b) means for directing an image of said indicia $\rho_I(x,y)$ through said filtering systems;
(c) means for moving said slits with respect to the image in time to utilize variations in the intensity of said light sources as said slits traverse said image so as to obtain weighting of said image $\rho_I(x,y)$ in one dimension;
(d) means for detecting a proportional fraction of the total light transmitted through each of said filtering systems as it traverses said image, each of said total energies being represented as a fraction of an integral $\iint \rho_I(x, y)\rho_{D_i}(x, y)dxdy$ as weighted by said filtering system so as to obtain a set of measurable voltage signals representative of said integrals;
(e) means for normalizing said set of voltage signals with respect to at least one possible variant of said indicia to obtain a set of normalized voltage values; and
(f) means for comparing said normalized voltage values with a set of predetermined voltages thereby to identify said indicia with a known indicia.

12. An apparatus in accordance with claim 11 wherein said slits are contoured such that their configuration accomplishes a weighting in accordance with a continuous mathematical function.

13. An apparatus for identifying information-bearing indicia, the image of which can be represented as a two-dimensional density function $\rho_I(x, y)$, comprising in combination
(a) a set of filtering systems comprising slits which weight a cross-section of said image according to a set of one-dimensional discriminant density functions;
(b) means for directing an image of said indicia $\rho_I(x, y)$ through said set of filtering systems;
(c) means for moving said slits with respect to the image in time to utilize variations of the relative velocity of said slits and said image so as to obtain weighting of said image $\rho_I(x, y)$ in one dimension;
(d) means for detecting a proportional fraction of the total light transmitted through each of said filtering systems as it traverses said image, each of said total energies being represented as a fraction of an integral $\iint \rho_I(x, y)\rho_{D_i}(x, y)dxdy$ as weighted by said filtering system so as to obtain a set of measurable voltage signals representative of said integrals;
(e) means for normalizing said set of voltage signals with respect to at least one possible variant of said indicia to obtain a set of normalized voltage values; and
(f) means for comparing said normalized voltage values with a set of predetermined voltages thereby to identify said indicia with a known indicia.

14. An apparatus for identifying information-bearing indicia, the image of which can be represented as a two-dimensional density function $\rho_I(x, y)$, comprising in combination
(a) a set of filtering systems comprising slits which weight a cross-section of said image according to a set of one-dimensional discriminant density functions $\rho_{D_i}(y)$;
(b) means for directing an image of said indicia $\rho_I(x, y)$ through said set of filtering systems;
(c) means for moving said slits with respect to the image in time;
(d) means for detecting a proportional fraction of the total light transmitted through each of said filtering systems to obtain at any instant of time a set of signals;
(e) means for integrating said set of signals as multiplied by predetermined one-dimensional discriminant density functions to obtain a set of integrals $$\iint \rho_I(x, y)\rho_{D_i}(y)dxdy$$

as weighted by said filtering systems so as to obtain a set of measurable voltage signals representative of said integrals;
(f) means for normalizing said set of voltage signals with respect to at least one possible variant of said indicia to obtain a set of normalized voltage values; and
(g) means for comparing said normalized voltage values with a set of predetermined voltages thereby to identify said indicia with a known indicia.

15. An apparatus for identifying information-bearing indicia, the image of which can be represented as a two-dimensional density function $\rho_I(x, y)$, comprising in combination
(a) a set of optical filtering systems which weight said image according to a set of two-dimensional discriminant density functions $\rho_{D_i}(x, y)$ so as to obtain optically a set of product images $\rho_I(x, y)\rho_{D_i}(x, y)$ of said density functions;

(b) means for directing an image of said indicia $\rho_I(x, y)$ through said set of optical filtering systems;

(c) photovoltaic means adapted to detect a proportional fraction of the total light transmitted through each of said optical filtering systems, each of said total energies being represented as a fraction of an integral $\iint \rho_I(x, y)\rho_{D_i}(x, y)dxdy$ as weighted by said optical filtering system so as to obtain a set of measurable voltage signals representative of said integrals;

(d) means for normalizing said set of voltage signals with respect to at least one possible variant of said indicia to obtain a set of normalized voltage values; and (e) means for comparing said normalized voltage values with a set of predetermined voltages thereby to identify said indicia with a known indicia.

References Cited by the Examiner

UNITED STATES PATENTS

| | | | |
|---|---|---|---|
| 2,805,022 | 9/1957 | Shelley | 235—181 |
| 2,820,173 | 1/1958 | Raabe | 235—181 |
| 2,978,675 | 4/1961 | Highleyman | 340—146.3 |
| 3,064,519 | 11/1962 | Shelton | 340—146.3 |
| 3,195,396 | 7/1965 | Horwitz et al. | 340—146.3 |

OTHER REFERENCES

Publication I: "Pattern Recognition Using Autocorrelation," by L. P. Horwitz and G. L. Shelton, Jr. in Proceedings of the IRE, January 1961, volume 49, No. 1, pp. 125–185.

MAYNARD R. WILBUR, *Primary Examiner.*

MALCOLM A. MORRISON, *Examiner.*

G. E. MEYERS, J. S. IANDIORIO, J. E. SMITH,
*Assistant Examiners.*